United States Patent

Salmon et al.

[11] Patent Number: 4,682,668
[45] Date of Patent: Jul. 28, 1987

[54] GO-CART

[76] Inventors: Michael E. Salmon, 2622 Makin, Flint, Mich. 48504; Paul W. Hunkele, 1506 Williamsburg, Flint, Mich. 48507

[21] Appl. No.: 747,169

[22] Filed: Jun. 20, 1985

[51] Int. Cl.$^4$ .............................................. B62D 61/12
[52] U.S. Cl. ..................... 180/209; 180/312; 180/908; 192/48.7
[58] Field of Search ............... 180/209, 208, 311, 312, 180/908; 192/48.7

[56] References Cited

U.S. PATENT DOCUMENTS

| | | | |
|---|---|---|---|
| 1,992,496 | 2/1935 | Marmon et al. | 180/54 |
| 2,784,794 | 3/1957 | Barenyi | 180/57 |
| 2,918,981 | 12/1959 | Rupp, II | 180/62 |
| 3,329,228 | 7/1967 | Harris | 180/208 |
| 3,477,538 | 11/1969 | Hall et al. | 105/51 |
| 3,561,556 | 2/1971 | Davies, III | 180/54 |
| 3,608,659 | 9/1971 | Gardner | 180/65 R |
| 3,794,132 | 2/1974 | Moon | 180/209 |
| 3,829,117 | 8/1974 | Park | 180/82 |
| 4,151,892 | 5/1979 | Francken | 80/77 H |
| 4,351,562 | 9/1982 | Twitchell et al. | 180/65 R |
| 4,399,883 | 8/1983 | Todokoro | 180/65 E |
| 4,407,383 | 10/1983 | Enokimoto et al. | 180/54 E |

*Primary Examiner*—John J. Love
*Assistant Examiner*—Ross Weaver
*Attorney, Agent, or Firm*—Burton, Parker & Schramm

[57] ABSTRACT

A motor-driven miniature vehicle having a wheel base less than or equal to its track, a pair of steerable front wheels and a pair of rear wheels, at least one of which is driven. The vehicle has positive camber and sufficient torsional stiffness and wheel radial spring rate so that the inside rear wheel is lifted completely off the ground in a turning maneuver. The vehicle being further provided with an engine drive train and mounting system which employs two centrifugal clutches, one having a low abrupt engagement and disengagement and the other having a gradual higher speed engagement and disengagement.

26 Claims, 6 Drawing Figures

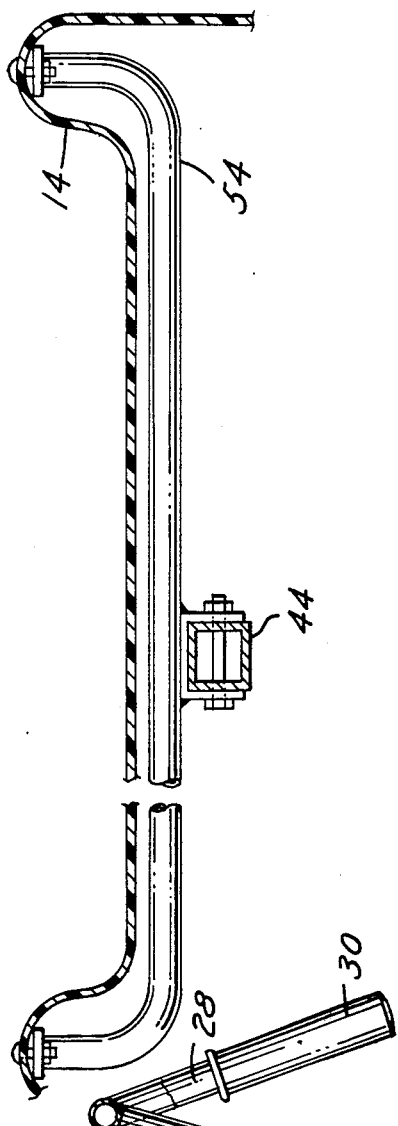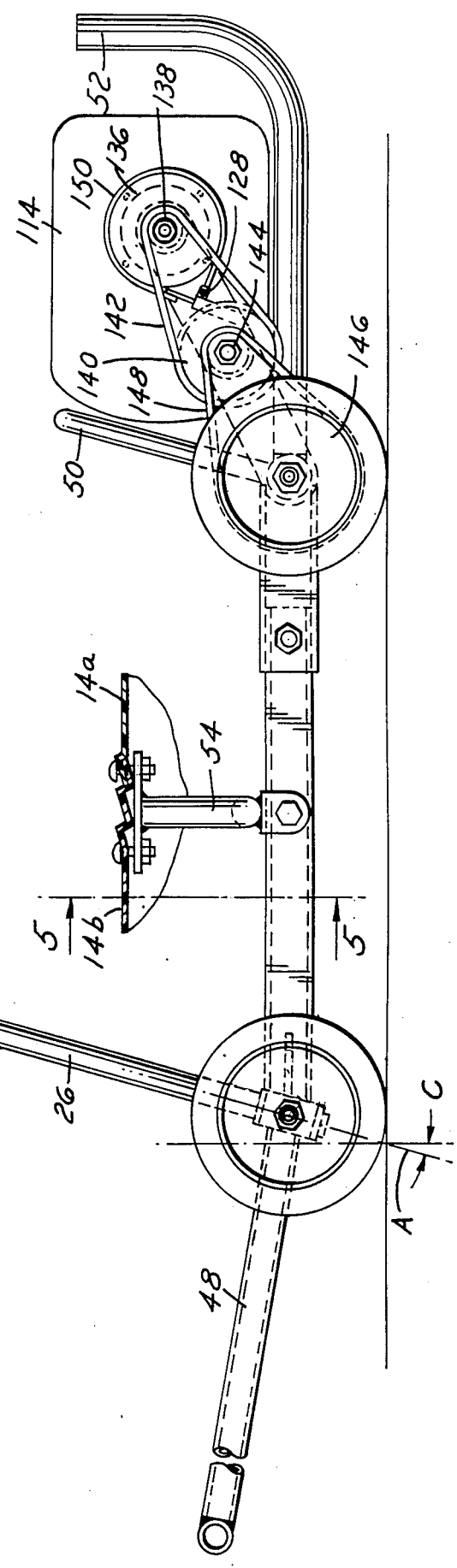

GO-CART

FIELD OF INVENTION

The present invention relates to the field of motorized vehicles and more particularly to small go-cart style vehicles with two front steerable wheels and a pair of rear wheels with at least one of the wheels being driven.

BACKGROUND OF THE INVENTION

Small motorized vehicles such as go-carts and the like have traditionally had a wheel base substantially longer than the wheel's track as shown in U.S. Pat. No. 3,829,117, Park or U.S. Pat. No. 2,918,981, Rupp. The turning circle diameter of existing go-carts is generally between 15 to 20 feet, reduction in turning circle in two-wheel steered vehicles causes sliding or scrubbing the non-steered wheels. When both rear wheels are fixed to a solid axle shaft, commonly referred to as a live axle, there is some tire scrubbing in even slow speed turns due to the fact that the outside wheel must travel a longer distance than the inside wheel which is located closer to the center of the turning circle. For a given wheelbase, the larger the vehicle's track, the greater amount of tire scrubbing owing to differences in turning circle radius. Some small motorized vehicles drive a single rear wheel which is on a stub axle so that the rear wheels may rotate independently in a turning maneuver eliminating tire scrubbing. One-wheel drive vehicles, however, tend to perform differently in turns as a function of engine power output and the direction of the turn.

SUMMARY OF THE INVENTION

We have disclosed a small motorized vehicle having a chassis, a front steerable pair of wheels and a pair of rear wheels wherein the vehicle's track is equal to or greater than the vehicle's wheelbase. Satisfactory performance is achieved by designing the steering geometry, chassis and wheels so that the vehicle turns on three wheels. The vehicle is further provided with a novel engine mounting assembly and a brake system acting on the clutch housing turning engine speed. The system utilizes two centrifugal clutches to achieve gradual engine coupling, yet fast decoupling, thereby preventing engine stalling during braking.

BRIEF DESCRIPTION OF THE DRAWINGS

FIG. 4 is a side view of the vehicle with the body removed.

FIG. 5 is a cross-sectional end view taken along line 4—4 in FIG. 4 showing the body mounting bracket affixed to the chassis.

DESCRIPTION OF THE PREFERRED EMBODIMENT

With reference to the drawings a preferred embodiment of the invention will hereinafter be described in detail.

Figure 1:
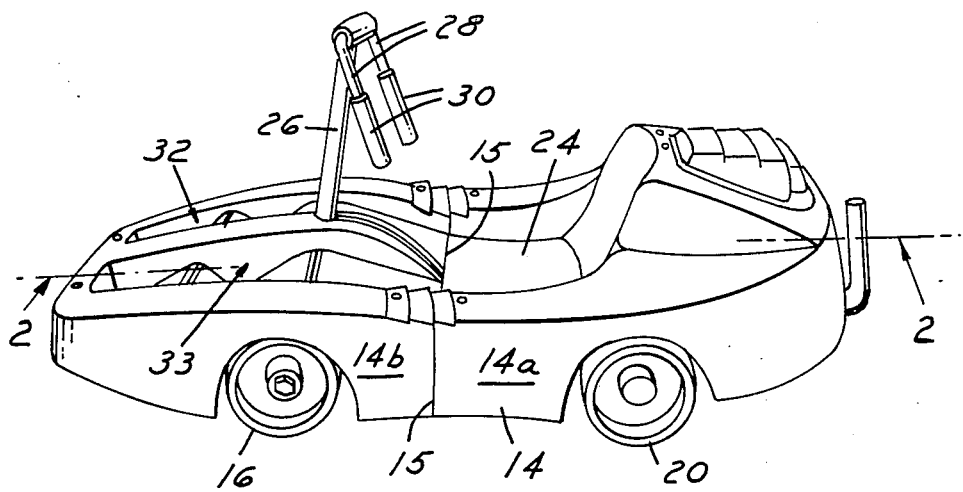
FIG. 1 is a side perspective view of a motorized vehicle according to this invention.
Figure 2:
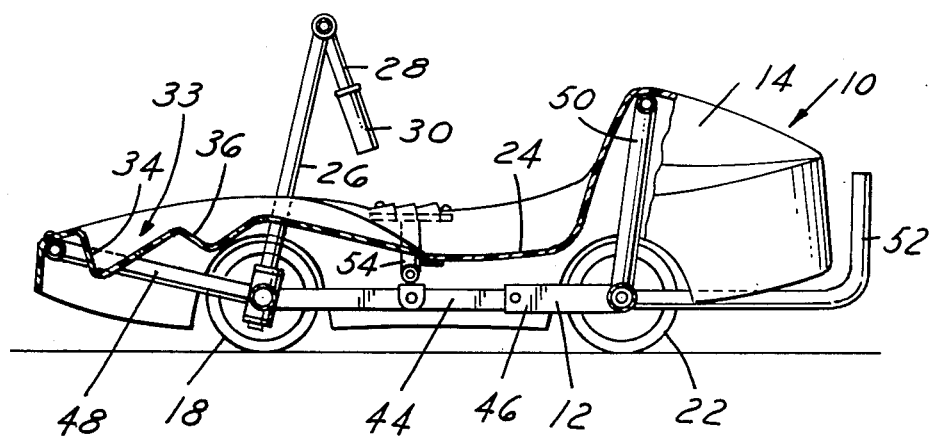
FIG. 2 is a cross-sectional side view taken along line 2—2 in FIG. 1.

FIG. 1 and 2 show a vehicle 10 which has a chassis 12 to which a body 14 is attached. The vehicle is provided with a pair of steerable front wheels 16, 18 and a pair of rear wheels 20, 22. The occupant of the vehicle sits in seat 24 which is integrally formed in body 14. Seat 24 is located centrally on the longitudinal axis of the vehicle and is generally between the front and rear wheel pairs. A steering column 26 projects upward from the vehicle and is rearwardly inclined toward the vehicle occupant at approximately 10° from vertical. Atop the steering column 26 are handlebars 28 provided with two grip proportions 30. The occupant, when seated in the vehicle, straddles the steering column and places his feet in a pair of foot pods 32 and 33 located on each side of the steering column. Each foot pod is provided with a pair of V-shaped transverse grooves 34, 36 which are formed integrally in the body 14. Foot pods 32 and 33 are designed to comfortably accommodate users of the vehicle of different sizes without seat or footrest adjustment.

Figure 3:
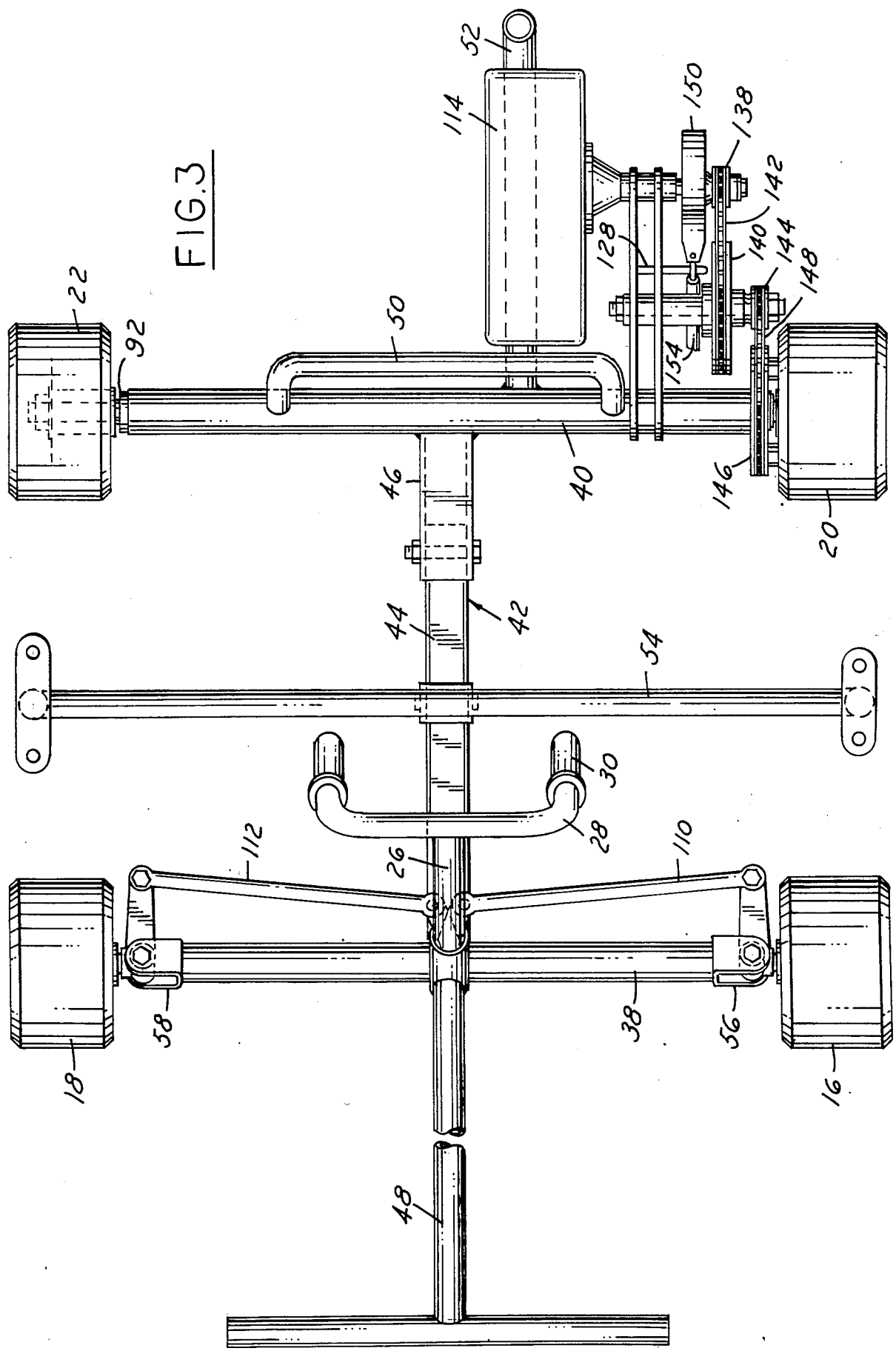
FIG. 3 is a plan view of the vehicle with the body removed.

A plan view of the chassis with the body removed is shown in FIG. 3. The chassis comprises three main members which form an "I": the front transverse tube 38, the rear transverse axle tube 40 and the central longitudinal member 42 which connects the front transverse tube and the rear axle tube. The central longitudinal member 42 can be made in two pieces, 44, 46 as shown to allow the frame to be taken apart and packaged in a small container for shipping purposes. The front and rear sections of the central member 44, 46 are formed of coaxial telescopic square steel tubing which is bolted together in a strong torsionally rigid joint.

Affixed to the front of the chassis is T-shaped member 48 which provides means for attaching the front of the body to the chassis. Attached to the rear axle tube 40 is U-shaped tube 50 which projects upwardly therefrom and serves a rearbody attachment point. Central body mount 54 is preferably attached perpendicular to central longitudinal member 42 to provide right and left side body attachment points. The body may be made up of front and rear components 14a and 14b as shown in FIGS. 1 and 2 for shipping purposes. These two body components preferably overlap at 15 and attach to the central body mount 54 as shown in FIGS. 4 and 5.

Projecting rearwardly from the rear axle tube is rear bumper 52 which protects the rear portion of the body from impact and also provides a convenient attachment point for a flag (not shown).

When the front wheels 16, 18 are in the straight-ahead position as shown in FIG. 3, they are generally coaxial with front transverse tube 38. The wheels attach in a conventional manner. Rigidly attached to each end of the front transverse tube 38 are kingpin brackets 56, 58. The kingpin brackets are generally C-shaped and are provided with upper holes 60, 62 and lower holes 64, 66 through which kingpins 68, 70 extend and are retained in place by kingpin nuts 72, 74. The kingpin axis A is inclined rearwardly as shown in FIG. 4 at an angle "C" to create a positive caster. The vehicle is designed with no camber or kingpin inclination when viewed from the front. Pivotably mounted on kingpins 68, 70 are spindle assemblies 76, 68. Each spindle assembly comprises a tube 80 coaxially mounted on the kingpin, a spindle shaft 82 projecting perpendicularly from the tube and a steering arm 84 projecting rearwardly from tube. The front wheels 16, 18 are freely rotatably attached to the spindle shafts 82. The wheels are provided with internal bearings (not shown) and held in place by wheel nuts 86.

The rear wheels 20, 22 are fixed to opposite ends of axle shaft 88 by rear wheel nut 90 and key 91. The rear axle shaft 88 is freely rotatably supported by a pair of axle bearings 92 in opposite ends of rear axle tube 40. The two rear wheels and the rear axle form a rear axle assembly rigidly connected to the chassis. The four wheels are generally similar in construction apart from the fact that the front wheels are mounted on bearings. The wheels have a cast aluminum hub 94 and a solid synthetic rubber tire 96. In the preferred embodiment, the tires are 1½ inches wide at the ground, are 1 inch thick radially and are made of 70–80 durometer material, causing the wheels to have a very high radial spring rate. The high radial tire spring rate is desirable so that the inside rear wheel can be lifted completely off the ground in a turning maneuver. A very soft pneumatic tire would have less of a tendency to lift cleanly off the ground and would tend to scrub in large-radius turns.

During a turning maneuver, the driver rotates the steering column 26 which pivotably rotates in bushings 98, 100 carried by the chassis. The steering column may be retained in place by waher 102 and cotter pin 104. Affixed to the steering column 26 are a pair of steering arms 106, 108 which are pivotably connected to steering arms 84 on the spindle assemblies by tierods 110, 112. As the steering column is rotated causing the wheels to turn, the wheel toward the inside of the turn drops down as a function of the camber angle and the distance between the wheel and the kingpin. The centerline of the wheel in the plan view is spaced 1⅜ inches from the kingpin centerline. The greater the caster angle and the greater the transverse spacing of the wheel relative to the kingpin, the greater the downward movement of the inside wheel. The outside front wheel moves upward in an opposite manner due to the caster angle.

When the vehicle is steered straight ahead the bottom tire surfaces of all four wheels rest on the ground. When the front wheels are turned, the four wheels will no longer lie in a common plane. When the wheels are turned in an unoccupied stationary vehicle, the outside front wheel will lift completely off the ground and the weight of the vehicle will be borne predominately by the inside front wheel and the outside rear wheel. In a normal moving turn situation, the weight of the occupant and the shift of the weight distribution to the outside wheels caused by the centrifugal force of the turn, will cause the outside front wheel to remain on the ground and the inside rear wheel to lift. If the vehicle has insufficient caster or insufficient torsional chassis rigidity, the inside rear wheel will not lift or lift sufficiently, during the turning maneuver to be clear of the ground and as a consequence will scrub. It is the vehicle's ability to turn on three wheels that enables a vehicle with such a short wheel base to perform satisfactorily without tire scrubbing.

To prevent tire scrubbing in tight turns, it is possible to go to a one-wheel drive vehicle, One-wheel drive vehicles, however, have serious problems especially when the wheel base is short. If the left rear wheel is driven, the force exerted by the wheel on the ground will generate a torque tending to turn the vehicle to the right on acceleration and turn the vehicle to the left on braking. In a vehicle having a wheel base to track ratio of 1 to 1 or less, it may not be possible to turn to the left while under power necessitating the occupant to back off the accelerator to maneuver the turn. Furthermore, in a tight left turn, the powered inside rear wheel could become sufficiently deloaded due to weight transfer to allow it to spin. The three-wheel steering vehicle shown herein having a solid rear axle alleviates these problems in a novel manner. One rear wheel is always on the ground to provide a tractive force and braking. The torque provided by the outside wheel will tend to encourage the vehicle to turn in the direction of the steering in-put.

The vehicle shown in the preferred embodiment has a central longitudinal tube torsional stiffness of 5000 in.-lb./°. Ideally the chassis torsional stiffness will be in the range of 3,000–7,000 in.-lb./°. It is important that the torsional stiffness in conjunction with the amount of caster and the tire radial spring rate be evaluated together. A softer chassis may require higher caster angles to achieve the desired turning characteristics. Similarly a vehicle with very soft tires would require a stiff chassis and a large caster angle to achieve optimum performance. Ideally, caster angles will be in the 8°–15° range. Angles of less than 8° will necessitate very stiff chassis and wheels and angles of more than 15° will either result in unnecessary wheel lift and steering effort or large amounts of chassis flexing.

The vehicle has achieved its turning characteristics by combining a previously described chassis structural characteristics with its short wheel base and wide relative track. Wheel base is defined as the longitudinal distance between front and rear wheel centers when the front wheels are in the straight ahead position. Track is defined by the maximum transverse distance between the centerlines of two tires forming a front or rear pair. The preferred embodiment of the invention shown has a wheel base to track ratio of approximately 0.8. Preferably the wheel base to track ratio is between the range of 0.6:1 to 1:1. Longer wheel base lengths will obviously work, however, the turning circle will progressively increase with an increased wheel base. Where the wheel base is less than 0.6 times the track, the vehicle will have a tendency to pitch fore and aft on acceleration and deceleration.

Figure 6:
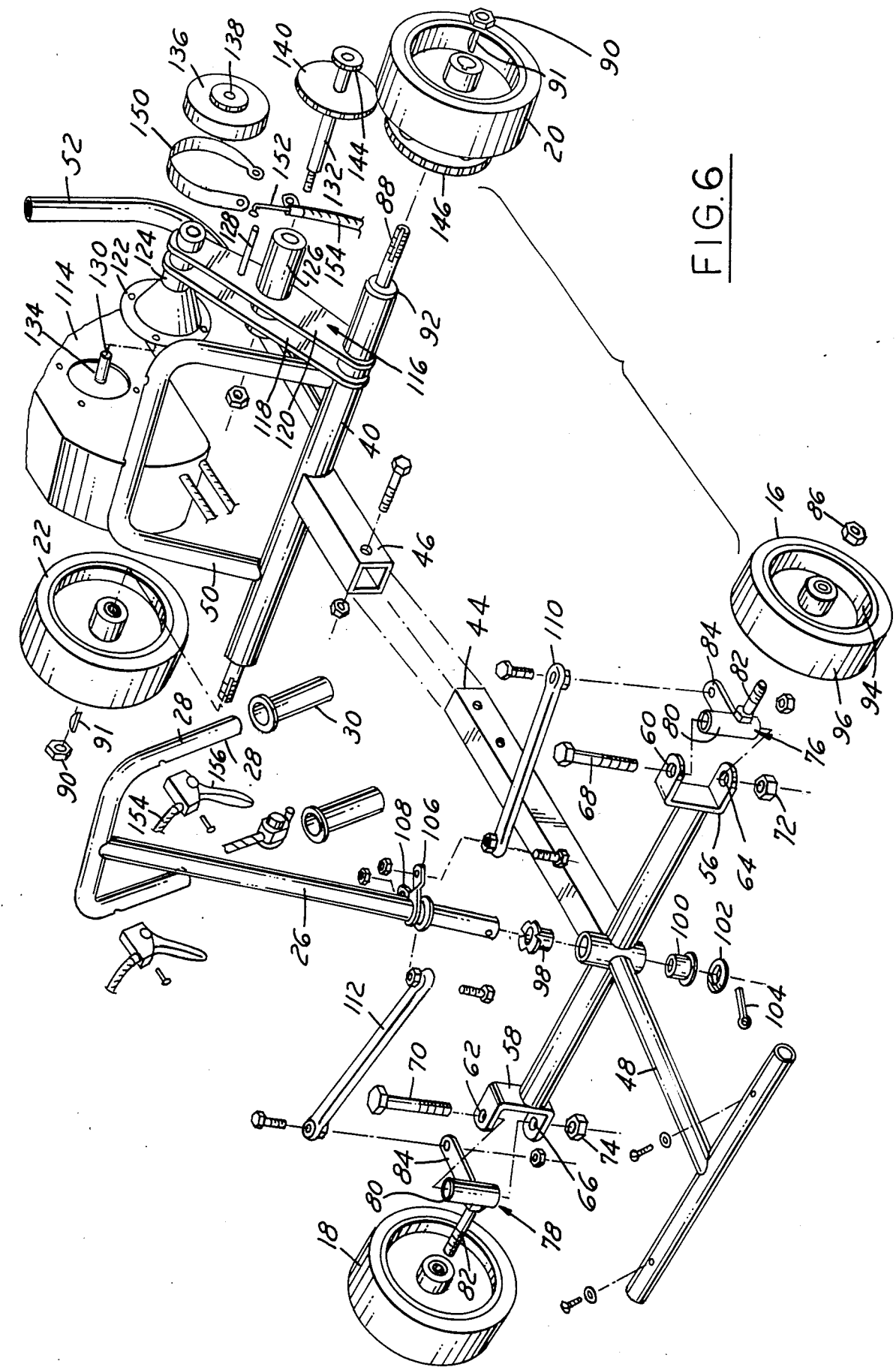
FIG. 6 is an exploded front-quarter perspective view of the vehicle with the body removed.

The engine 114 is fixed to the rear of the chassis directly behind the seat area and is attached to the rear axle tube 40 in a cantilevered manner by drive train and engine mounting bracket assembly 116. The engine is supported so that its power output and crankshaft rotate on an axis which is parallel to the rear axle shaft 88. Mounting bracket assembly 116 is made of a number of components welded together: a pair of structural plates 118, 120, an engine drive shaft support tube 124, an idler shaft support tube 126 and brake anchorpin 128. Plates 118, 120 are of a generally elongated shape and are welded at one end to the axle tube and extend rearwardly therefrom. At the end of the plates 118, 120 opposite the axle shaft, engine drive shaft support tube 124 is welded thereto. Idler shaft support tube is affixed to the plates generally centrally between the axle shaft and engine drive shaft support tube. The engine drive shaft support tube and the idler shaft support tube are oriented so that they are parallel to the axle. Engine mounting flange 122 is coaxially attached to the engine drive shaft support tube and is provided with means for movable attachment to the engine such as the bolt holes shown in FIG. 6.

While the preferred embodiment of the invention has an internal combustion engine as a power source, any form of motor having a rotary drive shaft may be used.

The term "motor" shall mean any power supply having a rotary out-put including electric motors and small internal combustion engines.

Engine drive shaft 130 is rotatably supported within the bore of engine drive shaft support tube 124 by conventional bearings (not shown). Idler shaft 132 is rotatably supported by idler shaft support tube 126 by conventional bearings (not shown) and is retained against axial movement by suitable means (not shown). Engine 114 is provided with a flush-mounted centrifugal clutch 134 attached directly to the end of its crank shaft which serves as a power output. Drive shaft 130 extends through the drive shaft support tube and is welded directly the drum of engine centrifugal clutch 134. Clutch 134, in addition to acting as a centrifugal clutch, also serves to act as a compliance device or a rotary coupling, allowing for slight drive shaft to engine crank shaft misalignment. Without such a compliance device, the slightest misalignment would cause excessive bearing wear and vibration.

Fixed to the end of the drive shaft 130 opposite the engine is centrifugal drum clutch 136. Attached to the output of centrifugal drum clutch 136 is the engine sprocket/pulley 138. While the preferred embodiment of the vehicle uses a sprocket and drive chain system, a pulley and belt system can alternatively be used. The phrase sprocket/pulley and endless loop are used as broad terms to encompass various forms of sprockets and pulleys and belts and chains. The engine sprocket pulley 138 is coupled to the driven idler sprocket/pulley by first endless loop 142. Driven idler sprocket/pulley 140 and drive idler sprocket/pulley 144 are axially spaced from one another and affixed concentrically with idler shaft 132. Driven idler sprocket/pulley 144 is rotatably coupled to the wheel sprocket pulley 146 by a second endless loop 148. In the preferred embodiment of the invention, the engine sprocket/pulley and the drive idler sprocket/pulley are sprockets having eleven teeth and the driven idler sprocket/pulley and the wheel sprocket/pulley are sprockets having 45 and 35 teeth respectively resulting in a 13.0:1 final drive ratio. Preferably the wheel sprocket 146 is removably attached to wheel 120 so that the sprocket/pulley may be changed to achieve the final drive ratio desired.

The vehicle is provided with a band brake 150 which cooperates with brake anchor pin 128 and the peripheral edge of centrifugal drum clutch 136. One end of the band brake is affixed to anchor pin 128 and the band wraps around the clutch drum and the opposite end is attached to brake cable 152. The cable sheath 154 is similarly attached to the brake anchor pin so that the sheath cable can be conveniently routed to the hand brake 156 which is attached to the left side of handle bar 28. The occupant by squeezing the hand brake lever tightens the band brake around the centrifugal clutch drum which is rotably coupled to the rear axle assembly via the series of sprocket/pulleys and endless loops previously described. Since the centrifugal clutch drum rotates substantially faster than the axle, very little hand brake effort is required compared to the effort which would be necessary for a similar diameter drum attached to the axle.

A problem associated with braking on the centrifugal drum clutch is engine stalling in a sudden brake maneuver. This problem is alleviated by use of the two centrifugal clutches 134 and 136 in series with differing engagement speeds and characteristics. The engine centrifugal clutch 134 has an activation speed slightly above engine idle speed and an abrupt engagement. The centrifugal drum clutch has an engagement speed above that of the engine centrifugal clutch and a softer, or more gradual engagement. The soft engagement is very desirable when accelerating from a standstill. When the brake is abruptly applied, however, the centrifugal drum clutch is slow to disengage and an abrupt stop will kill the engine. The engine clutch, being very fast-acting, will decouple the engine from the drive shaft in a hard braking maneuver prior to engine stalling. This feature also enhances the braking since the engine inertia is decoupled from the drive train system.

During acceleration and braking of the vehicle, the tensile load in the endless loops 142, 148 will cause a bending load on the idler support tube 126. The drive and driven idler sprocket/pulleys 144, 140 are attached to the mounting bracket assembly in a cantilevered manner. It is therefore desirable to have the bending loads minimized by locating the shaft so that the force exerted by the first and second endless loops are generally opposite and offsetting one another.

It is also understood, of course, that while the form of the invention herein shown and described constitutes a preferred embodiment of the invention, it is not intended to illustrate all possible forms thereof. It will also be understood that the words used are words of description rather than limitation and the various changes may be made without departing from the spirit and scope of the invention disclosed.

We claim:
1. A motorized vehicle comprising:
   a chassis having a longitudinal axis, and a front and rear transverse axis each of which have two ends and are perpendicular to the longitudinal axis;
   a pair of spindle assemblies each having two ends, the first end pivotably affixed to the chassis at opposite sides of the first transverse axis and pivotable about a steering axis having positive chamber, and the second end projecting outwardly therefrom;
   a pair of steerable front wheels each freely rotatably attached to a spindle assembly second end whereby when the wheels and spindle assembly are steered during a turning maneuver the inside wheel moves downwardly and the outside wheel moves upwardly causing the load borne by the inside rear wheel to significantly reduce independent of vehicle speeds;
   a pair of rear wheels rotatably affixed to opposite ends of an elongated rear axle, the axle cooperating with the chassis, rotatable about the rear transverse axis;
   a motor affied to the chassis and coupled to the rear axle for driving the vehicle; and
   wherein the vehicle has a wheel base which is less than or equal to the vehicle's track.
2. The vehicle of claim 1 wherein the wheel base is between 0.6 to 1.0 times the track.
3. The vehicle of claim 2 wherein said chassis has sufficient torsional stiffness about its longitudinal axis, chamber, and wheel radial spring rate to cause the inside rear wheel to lift completely off the ground in a turning maneuver when the front wheels are rotated more than 20 degrees about the steering axis.
4. The vehicle of claim 3 wherein the wheelbase is substantially equal to 0.8 times the track.
5. A motorized vehicle comprising:
   a chassis;

a pair of freely rotatable front wheels attached to the chassis and steerably pivotable about a steering axis having positive caster;

a rear axle rotatably cooperating with the chassis;

a pair of rear wheels spaced apart and fixably attached to the rear axle for rotation therewith creating a rear axle assembly;

a motor for propulsion of the vehicle affixed to the chassis and cooperating with the rear axle assembly for driving same;

wherein the vehicle has sufficient caster, wheel radial spring rate, and chassis torsional stiffness along the longitudinal axis to cause the inside rear wheel in a turn to lift completely off the ground so that the vehicle rests solely on the inside front wheel and the outside wheels, the rear wheel being driven thereby allowing the vehicle to have a very tight turning circle and minimizing rear wheel scrubbing.

6. The vehicle of claim 4 wherein the steering axis between 5 to 15 degrees of positive caster.

7. The vehicle of claim 6 wherein the chassis torsional stiffness is greater than 3,000 in.-lbs./degree.

8. The vehicle of claim 5 wherein said chassis torsional stiffness is greater than 3,000 in.-lbs./degree.

9. The vehicle of claim 8 wherein one of the vehicle's wheels will lift completely off the ground when the front wheels are turned 20 degrees or more in either direction when the vehicle is stationary.

10. The vehicle of claim 9 wherein said front wheels may turn at least 40 degrees in either direction about the steering axis.

11. The vehicle of claim 10 wherein said chassis is I-shaped and formed of a front transverse member, a rear transverse member and a longitudinal member on the center line of the vehicle fixed to the front and rear transverse member.

12. The vehicle of claim 5 further comprising a motor mounting bracket fixed to the rear transverse member and cantilevered rearwardly for attachment of the motor.

13. The vehicle of claim 12 wherein said motor comprises an internal combustion engine.

14. The vehicle of claim 5 further comprising a body attached to the chassis providing a seat for the vehicle's occupant.

15. The vehicle of claim 14 wherein the body is provided with a pair of footrests located in front of the front wheels.

16. A drive train and engine mounting bracket assembly for a vehicle having an engine with a drive shaft extending therefrom, a chassis having an axle housing and at least one driven wheel pivotably cooperating with the axle housing for rotation about a wheel axis, said assembly comprising:

an engine bracket affixed to the axle housing at one end and extending therefrom in a cantilevered manner generally perpendicular to the wheel axis, said engine bracket being attached to the engine holding same with the drive shaft parallel to the wheel axis;

an engine sprocket/pulley affixed to the engine drive shaft;

a wheel sprocket/pulley affixed to the driven wheel;

an idler support affixed to the engine bracket between the engine drive shaft and axle housing having an idler axis parallel to the wheel axis;

an idler rotatably attached to the idler support in a cantilevered manner relative to the engine bracket, said idler having a drive and driven sprocket/pulley;

a first endless loop coupling the engine sprocket/pulley to the idler-driven sprocket/pulley;

a second endless loop coupling the idler-driven sprocket/pulley to the wheel sprocket/pulley; and whereby the sprocket/pulleys are sized in such a manner as to provide the desired ratio between the engine drive shaft and the wheel.

17. The assembly of claim 16 wherein said idler is located generally between the engine drive shaft and the wheel axis thereby causing the bending load on the idler support due to the tension in the first endless loop and the second endless loop to be in generally opposite directions thereby minimizing bending load.

18. In a motorized vehicle a drive train for coupling the engine drive shaft to wheels of the vehicle comprising:

a first centrifugal clutch cooperating with the engine drive shaft; and a second centrifugal clutch cooperating in series with the first centrifugal clutch and the vehicle wheels;

one clutch having a low engagement speed with an abrupt engagement and disengagement characteristic and the other clutch having a higher engagement speed with a gradual engagement/disengagement characteristic, the resulting combination having a gradual engagement and an abrupt disengagement.

19. The assembly of claim 18 further comprising a brake means cooperating with a rotating element constantly coupled to the driven wheel.

20. The assembly of claim 19 wherein the output of the centrifugal clutch cooperating with the vehicle wheels is further provided with rotating drum housing for cooperation with the brake means and same brake means further comprises a band brake.

21. A centrifugal clutch assembly for an engine-powered vehicle comprising a first and second centrifugal clutch each cooperating with one another in series and each having an input and output which are free to rotate relative to one another below their respective engagement speeds, wherein the first clutch has a relatively low engagement speed and the second clutch has a relatively high engagement speed.

22. The assembly of claim 21 wherein the first clutch as a abrupt engagement and disengagement characteristics and the second clutch has gradual engagement and disengagement characteristics resulting in the assembly having a gradual engagement and an abrupt disengagement.

23. The assembly of claim 22 wherein the input of the first clutch is coupled to an engine.

24. The assembly of claim 23 futher comprising brake means cooperating with the output of the second centrifugal clutch.

25. The assembly of claim 24 wherein the second centrifugal clutch is provided with a rotating cylindrical drum output housing for cooperation with the brake means.

26. The assembly of claim 25 wherein the engine, the first and second centrifugal clutch and the brake means are all coaxial with one another.

* * * * *

UNITED STATES PATENT AND TRADEMARK OFFICE
CERTIFICATE OF CORRECTION

PATENT NO. : 4,682,668

DATED : July 28, 1987

INVENTOR(S) : Michael E. Salmon and Paul W. Hunkele

It is certified that error appears in the above-identified patent and that said Letters Patent is hereby corrected as shown below:

In claim 1, column 6, line 22, please delete the word "affied" and insert in its place the word ---affixed---.

In claim 6, column 7, line 2, please delete the numeral "5" and insert in its place the numeral ---8---.

In claim 22, column 8, line 2, please delete the phrase "as a" and insert in its place the word ---has---.

Signed and Sealed this

First Day of December, 1987

Attest:

DONALD J. QUIGG

Attesting Officer

Commissioner of Patents and Trademarks